(12) United States Patent
Kim et al.

(10) Patent No.: US 10,965,509 B2
(45) Date of Patent: Mar. 30, 2021

(54) METHOD FOR SETTING REFERENCE SIGNAL FOR V2V COMMUNICATION IN WIRELESS COMMUNICATION SYSTEM AND DEVICE FOR SAME

(71) Applicant: LG ELECTRONICS INC., Seoul (KR)

(72) Inventors: Youngtae Kim, Seoul (KR); Hanbyul Seo, Seoul (KR); Inkwon Seo, Seoul (KR); Hyukjin Chae, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 230 days.

(21) Appl. No.: 15/580,606

(22) PCT Filed: Jun. 20, 2016

(86) PCT No.: PCT/KR2016/006526
§ 371 (c)(1),
(2) Date: Dec. 7, 2017

(87) PCT Pub. No.: WO2016/204590
PCT Pub. Date: Dec. 22, 2016

(65) Prior Publication Data
US 2018/0176058 A1  Jun. 21, 2018

Related U.S. Application Data

(60) Provisional application No. 62/245,259, filed on Oct. 22, 2015, provisional application No. 62/214,208, (Continued)

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0048* (2013.01); *H04L 27/2657* (2013.01);
(Continued)

(58) Field of Classification Search
CPC ............. H04L 27/2675; H04L 27/2657; H04L 27/2613; H04L 5/0048; H04W 72/0406; H04W 76/14
See application file for complete search history.

(56) References Cited

U.S. PATENT DOCUMENTS

2012/0020323 A1   1/2012  Noh et al.
2014/0328260 A1   11/2014  Papasakellariou et al.
(Continued)

FOREIGN PATENT DOCUMENTS

WO   2014149062 A1   9/2014
WO   2015020398 A1   2/2015

OTHER PUBLICATIONS

Qualcomm; "LTE-based Vehicle to Vehicle Communications", 3GPP RAN #88, RP-150626, Jun. 2015.

*Primary Examiner* — Omer S Mian
(74) *Attorney, Agent, or Firm* — Dentons US LLP

(57) ABSTRACT

The present invention relates to a method and a device for receiving a reference signal of a first vehicle-to-vehicle (V2V) device for V2V communication in a wireless communication system. Particularly, the present invention comprises the steps of: receiving a reference signal configuration defined for the offset correction of a center frequency for V2V communication; and decoding a reference signal defined according to the reference signal configuration in a specific resource region, wherein the reference signal configuration is set such that a time interval between orthogonal (Continued)

frequency division multiple access (OFDM) symbol indexes, to which the reference signal is allocated, has a pre-defined size.

10 Claims, 21 Drawing Sheets

Related U.S. Application Data filed on Sep. 4, 2015, provisional application No. 62/181,746, filed on Jun. 18, 2015.

(51) Int. Cl.
*H04W 4/46* (2018.01)
*H04L 27/00* (2006.01)

(52) U.S. Cl.
CPC ........ *H04L 27/2675* (2013.01); *H04L 5/0007* (2013.01); *H04L 27/2656* (2013.01); *H04L 2027/0026* (2013.01); *H04W 4/46* (2018.02)

(56) References Cited

U.S. PATENT DOCUMENTS

| | | | |
|---|---|---|---|
| 2015/0029874 A1* | 1/2015 | Davydov | H04L 1/0027 370/252 |
| 2015/0326362 A1* | 11/2015 | Xiong | H04W 8/005 370/336 |
| 2016/0127097 A1* | 5/2016 | Chen | H04L 5/0051 370/330 |
| 2016/0295624 A1* | 10/2016 | Novlan | H04W 76/14 |
| 2018/0063820 A1* | 3/2018 | Xiong | H04W 72/042 |

* cited by examiner

FIG. 2
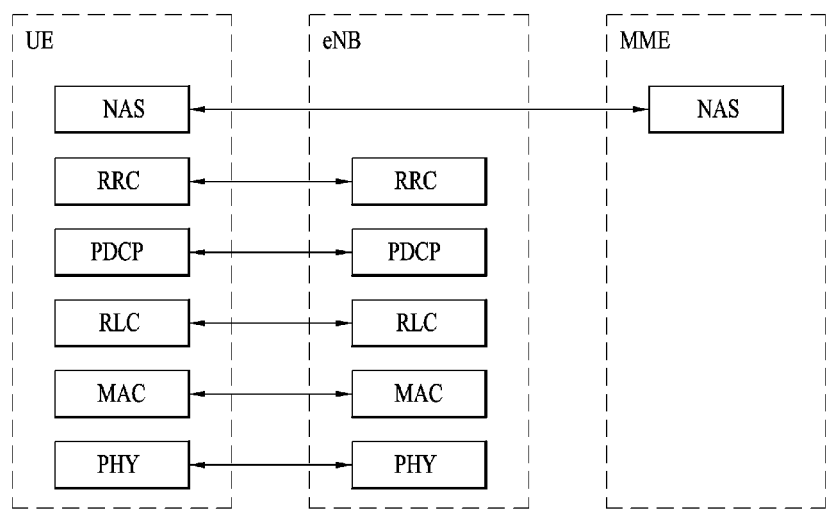
(a) Control-plane protocol stack
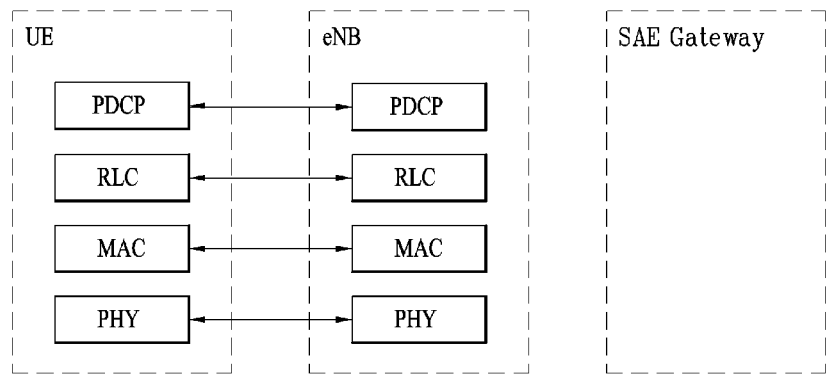
(b) User-plane protocol stack FIG. 8
(a) 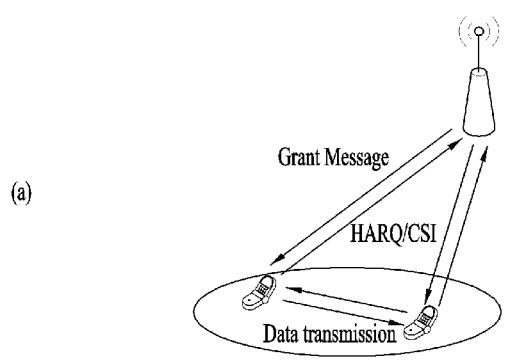
(b) 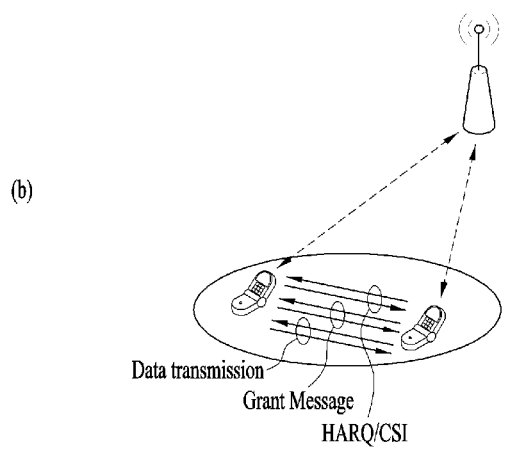

One sub-frame

One sub-frame

METHOD FOR SETTING REFERENCE SIGNAL FOR V2V COMMUNICATION IN WIRELESS COMMUNICATION SYSTEM AND DEVICE FOR SAME

This application is a 35 USC § 371 National Stage entry of International Application No. PCT/KR2016/006526 filed on Jun. 20, 2016, and claims priority to U.S. Provisional Application No. 62/181,746 filed on Jun. 18, 2015; 62/214,208 filed on Sep. 4, 2015 and 62/245,259 filed on Oct. 22, 2015, all of which are hereby incorporated by reference in their entireties as if fully set forth herein.

TECHNICAL FIELD

The present invention relates to a wireless communication system, and more particularly, to a method of configuring a reference signal for V2V communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the present invention intends to propose a method of configuring a reference signal for V2V communication in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a reference signal, which is received by a first V2V device to perform V2V (vehicle-to-vehicle) communication in a wireless communication system, includes the steps of receiving a reference signal configuration defined for compensating for an offset of a center frequency for performing the V2V communication and decoding a reference signal defined according to the reference signal configuration in a specific resource region. In this case, the reference signal configuration can configure a time interval between indexes of OFDM (orthogonal frequency division multiple access) symbols to which the reference signal is assigned to have a predefined size.

Preferably, the predefined size is less than 6 OFDM symbols.

Preferably, the OFDM symbols includes a first OFDM symbol and a second OFDM symbol, each of which has a different OFDM symbol index and the first OFDM symbol and the second OFDM symbol can be symmetrically assigned on the basis of a frequency axis.

Preferably, the reference signal can be assigned to first resource elements corresponding to at least one first frequency on the indexes of the OFDM symbols. More preferably, either data or a signal for a second V2V device can be assigned to second resource elements corresponding to a second frequency different from the first frequency on the indexes of the OFDM symbols.

Preferably, either data or a signal for a second V2V device can be assigned to second resource elements corresponding to a second frequency different from a first frequency on the indexes of the OFDM symbols.

Preferably, the reference signal can be configured not to be assigned to the first OFDM symbol and the last OFDM symbol in the specific resource region.

Preferably, subcarrier shift can be configured to be performed on the reference signal in the specific resource region via modulo arithmetic.

Preferably, an orthogonal code corresponding to the number of resource elements to which the reference signal is assigned can be configured to be applied to the reference signal.

Preferably, the reference signal configuration can indicate a reference signal assigned to a resource element consisting of a plurality of rows and a resource element consisting of a plurality of columns.

To further achieve these and other advantages and in accordance with the purpose of the present invention, according to a different embodiment, a method of receiving a reference signal, which is received by a first V2V device to perform V2V (vehicle-to-vehicle) communication in a wireless communication system, includes the steps of receiving a reference signal configuration defined for compensating for an offset of a center frequency for performing the V2V communication and decoding a reference signal defined according to the reference signal configuration in a specific resource region. In this case, the reference signal configuration can be configured to change a subcarrier index in proportion to a change of an OFDM (orthogonal frequency division multiple access) symbol index in the specific resource region.

To further achieve these and other advantages and in accordance with the purpose of the present invention, according to a further different embodiment, a V2V device receiving a reference signal for performing V2V (vehicle-to-vehicle) communication in a wireless communication system includes an RF (radio frequency) unit and a processor, the processor configured to receive a reference signal configuration defined for compensating for an offset of a center frequency for performing the V2V communication, the processor configured to decode a reference signal defined according to the reference signal configuration in a specific resource region. In this case, the reference signal configuration can configure a time interval between indexes of OFDM (orthogonal frequency division multiple access) symbols to which the reference signal is assigned to have a predefined size.

Advantageous Effects

According to embodiments of the present invention, it is able to efficiently configure a reference signal for V2V communication in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 8 is a diagram for explaining D2D (UE-to-UE communication) communication;

BEST MODE

Mode for Invention

Figure 1:
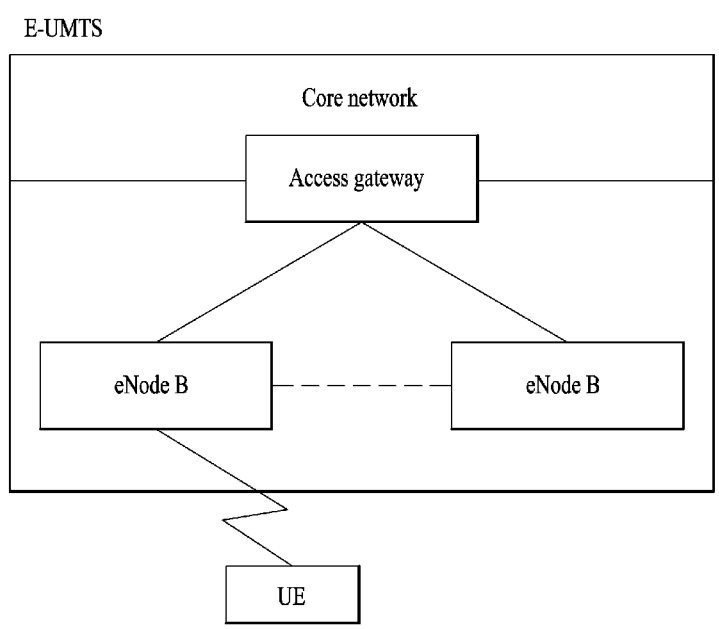
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
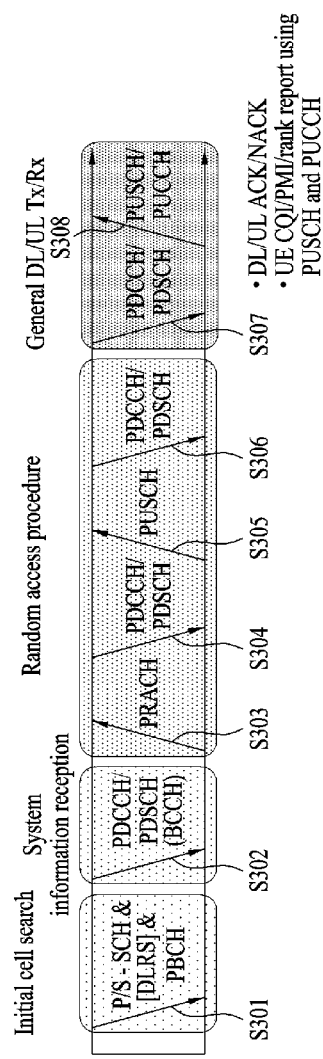
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
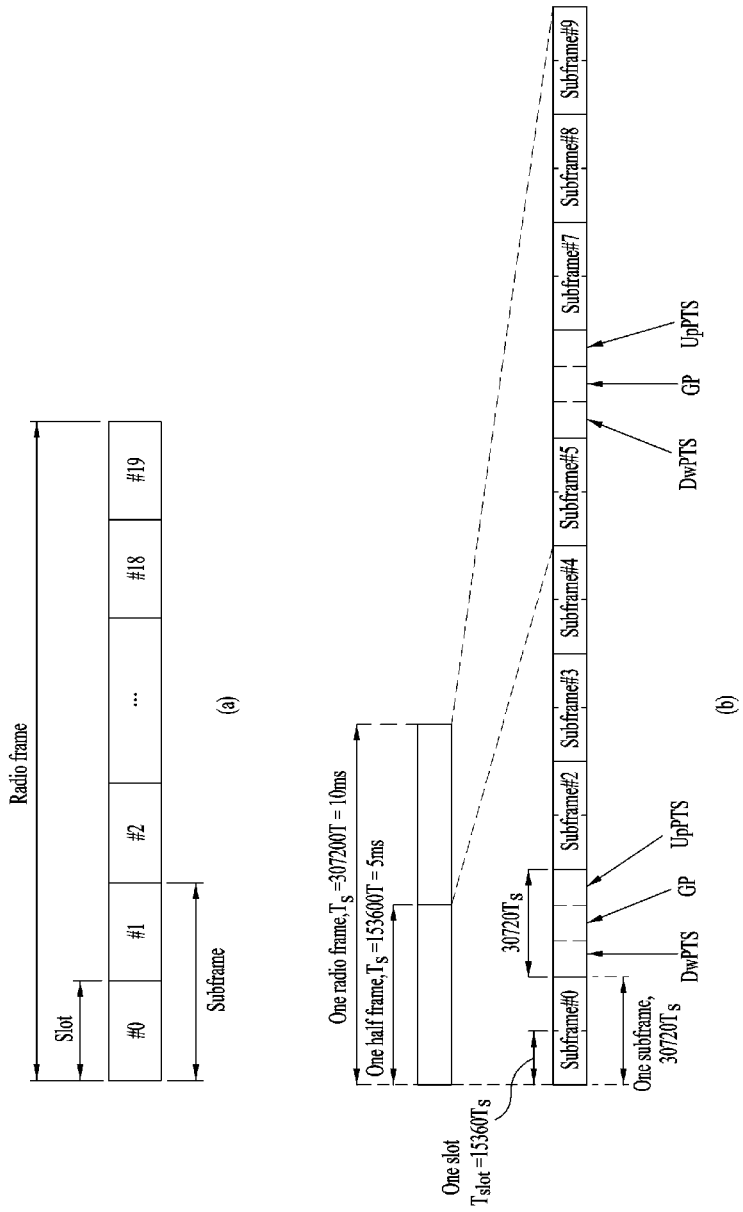
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
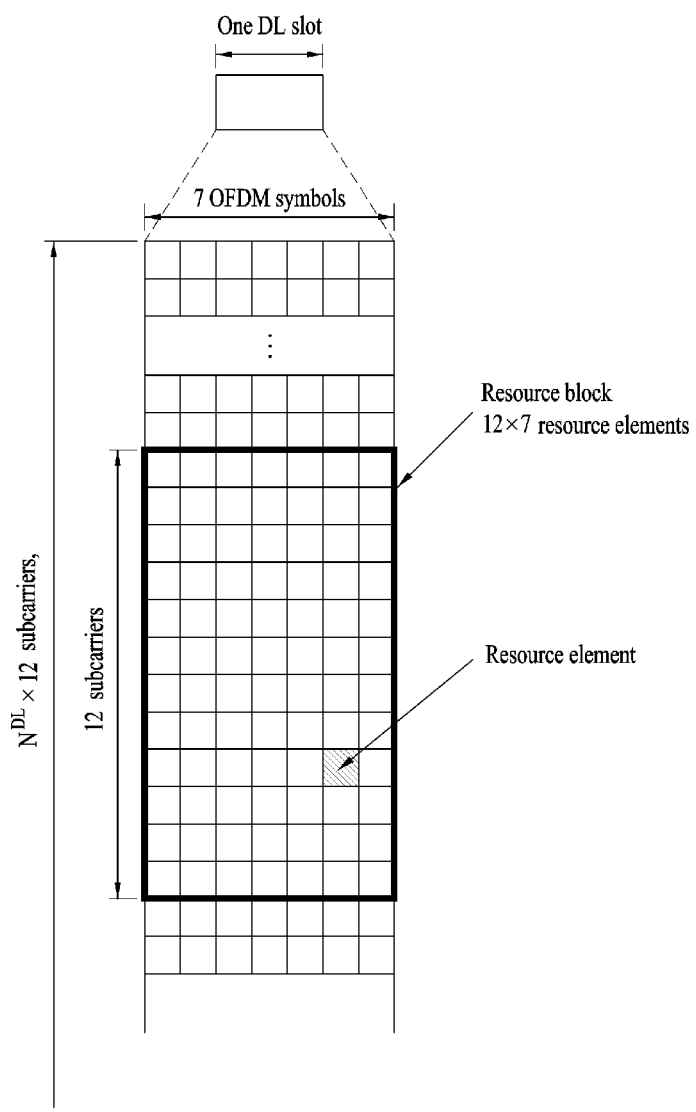
FIG. 5 is a diagram for an example of a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
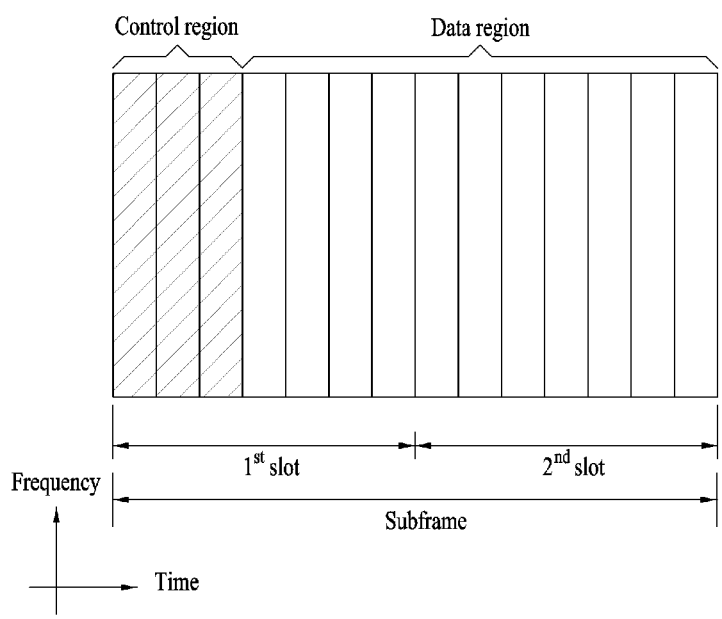
FIG. 6 is a diagram illustrating a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
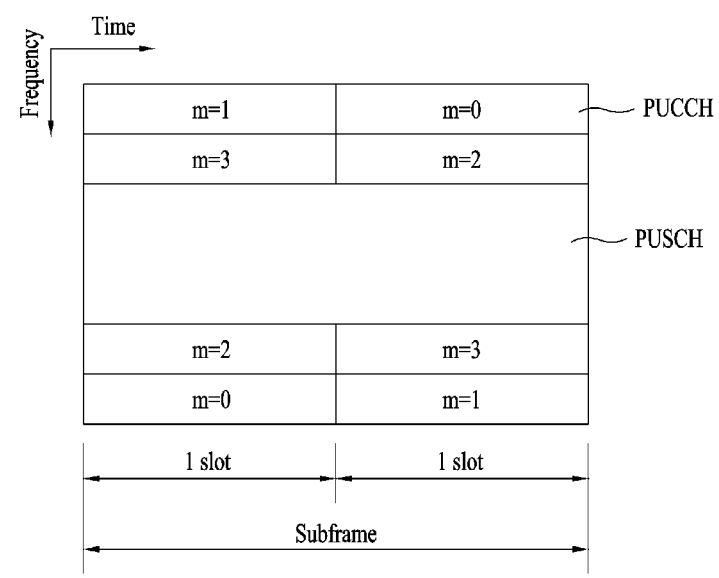
FIG. 7 is a diagram illustrating a structure of an uplink subframe used in an LTE system.

FIG. 7 is a diagram illustrating a structure of an uplink subframe used in an LTE system.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.
- SR (scheduling request): Information used for requesting uplink UL-SCH resource. OOK (on-off keying) scheme is used to transmit the SR.
- HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.
- CSI (channel state information): Feedback information on a DL channel CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following description, a D2D (UE-to-UE communication) communication is explained.

A D2D communication scheme is mainly divided into a scheme of receiving help from a network/coordination station (e.g., a base station) and a scheme not receiving help from the network/coordination station.

Referring to FIG. 8, FIG. 8 (*a*) shows a scheme that the network/coordination station involves in transmitting and receiving a control signal (e.g., a grant message), HARQ, channel state information, and the like and data is transmitted and received only between UEs performing D2D communication. FIG. 8 (*b*) shows a scheme that the network provides minimum information (e.g., D2D connection information capable of being used in a corresponding cell, etc.) to UEs and the UEs performing D2D communication form a link and perform data transmission and reception.

Figure 9:
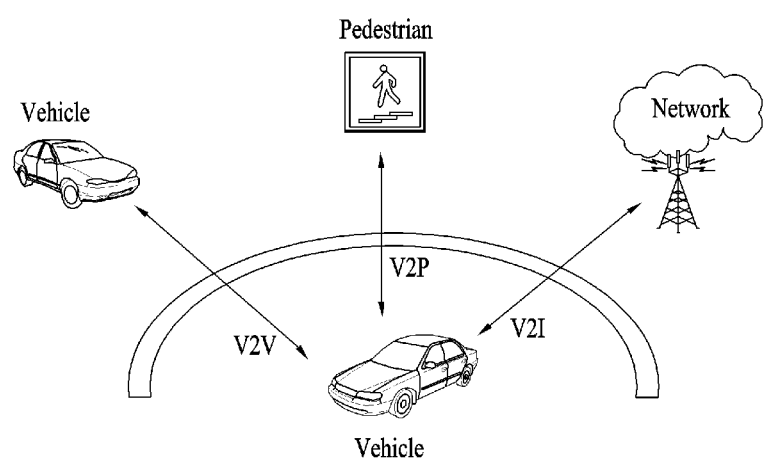
FIG. 9 is a diagram for explaining a V2V scenario.

FIG. 9 is a diagram illustrating V2X (vehicle to everything) communication environment.

If a car accident occurs, damage of human life and damage of property occur. Hence, when a vehicle operates, a technology capable of securing not only the safety of a person on the vehicle but also the safety of a pedestrian is increasingly required. As a result, a hardware and software based technology specialized to a vehicle is now incorporated into a vehicle.

An LTE-based V2X (vehicle-to-everything) communication technology started from 3GPP also reflects the tendency that an IT (information technology) is incorporated into a vehicle. A connectivity function is mainly applied to a certain type of vehicle and ongoing effort to support V2V (vehicle-to-vehicle) communication, V2I (vehicle-to-infrastructure) communication, V2P (vehicle-to-pedestrian) communication, and V2N (vehicle-to-network) is in progress via the evolution of the connectivity function.

According to the V2X communication, a vehicle consistently broadcasts information on a location, a speed, a direction, and the like of the vehicle. Having received the broadcasted information, an adjacent vehicle recognizes movement of vehicles near the adjacent vehicle and utilizes the movements to prevent an accident.

Similar to a case that a person possesses a terminal having a shape of a smartphone or a smart watch, a terminal (or, a UE (user equipment)) of a specific shape is installed in each vehicle. In this case, the UE installed in a vehicle corresponds to a device receiving an actual communication service from a network. For example, the UE installed in the vehicle can receive a communication service in a manner of accessing an eNB in E-UTRAN.

Yet, in order to implement V2X communication in a vehicle, it is necessary to consider various items. This is because an astronomical amount of money is required to install a traffic safety infrastructure such as a V2X eNB, and the like. In particular, in order to support the V2X communication to all of the roads on which a vehicle is movable, it is necessary to install hundreds of thousands of V2X eNBs. Moreover, since each network node basically uses a wired network to stably perform communication with a server and accesses the internet or a central control server using the wired network, installation/maintenance cost for the wired network is also high In the following, a method of designing a DMRS to overcome a frequency offset error is mainly described in the present invention. Although the present invention is explained centering on the V2V for clarity, the present invention can also be applied to a different scenario such as D2D and the like.

Figure 10A:
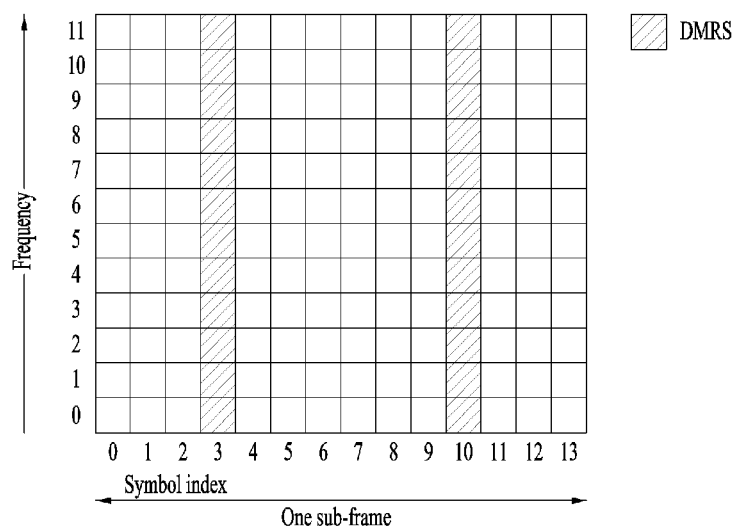
FIG. 10 is a diagram illustrating a DMRS structure in LTE system.
Figure 10B:
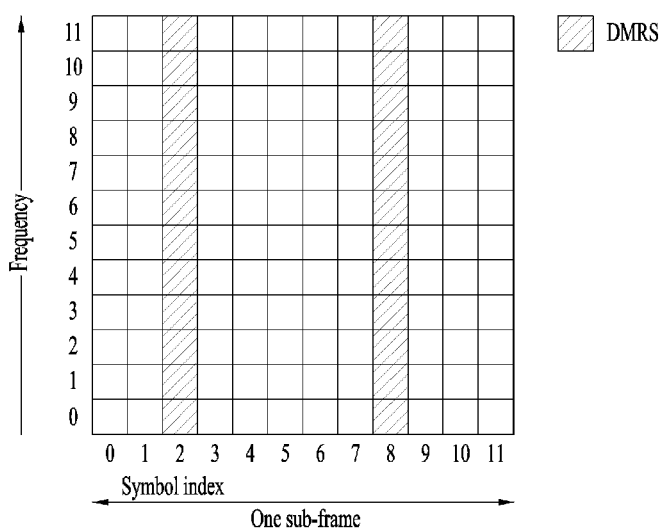

In V2V communication, it may be able to use a legacy LTE PUSCH structure-based subframe structure. In this case, FIG. 10a shows a DMRS structure in case of using a normal CP of current LTE in a subframe and FIG. 10b shows a DMRS structure in case of using an extended CP. Basically, according to a DMRS (demodulation reference signal) design shown in FIG. 10a or FIG. 10b, a DMRS is designed in a manner of mapping the DMRS to all resource elements of several OFDM symbol indexes in a subframe in consideration of a PARR (peak-to-average power ratio). In V2V communication, a receiver can be installed in a vehicle in accordance with the development of the technology. Hence, the PARR may not cause any serious problem. Thus, the present invention concentrates on a DMRS design considering a frequency offset rather than the PARR.

Moreover, according to a V2V scenario currently discussed in LTE, 5.9 GHz, which is used for DSRC (dedicated short range communication), can also be considered as a center frequency target.

Currently, a requirement for an initial frequency offset corresponds to 10 ppm (pulses per minute) and a residual frequency offset requirement corresponds to +/−0.1 ppm. Assume that two vehicles hold sync via a signal provided by a common eNB, a common vehicle, or a common source. In this case, a frequency offset difference between the two vehicles may correspond to +/−0.2 ppm. When a vehicle holds sync via a different vehicle, it might say that the vehicles have 2 hop syncs. If two vehicles hold 2 hop syncs from the same vehicle, a frequency offset difference between the two vehicles may correspond to +/−0.4 ppm. If two vehicles hold 3 hop syncs from the same vehicle, a frequency offset difference between the two vehicles may correspond to +/−0.6 ppm.

If it is assumed that a DMRS is designed like FIG. 10a and a frequency offset is compensated via DMRSs of 2 columns, it is necessary to measure an amount of phase offset due to a frequency offset increased during 0.5 ms. This is because a frequency offset is estimated based on the amount of the phase offset.

Table 3 in the following shows an amount of phase offset increased during 0.5 ms according to a center frequency or a plurality of hop syncs.

TABLE 3

| Carrier Frequency | Phase increment over 0.5 ms (DMRS interval) | | |
|---|---|---|---|
| | 0.1 ppm | 0.4 ppm | 0.6 ppm |
| 700 MHz | 70 Hz => 0.22 rad | 280 Hz => 0.88 rad | 420 Hz => 1.32 rad |
| 2 GHz | 200 Hz => 0.63 rad | 800 Hz => 2.51 rad | 1200 Hz => 3.77 rad > pi |
| 5.9 GHz | 590 Hz => 1.85 rad | | |

As shown in Table 3, although a frequency offset as much as +/−0.6 ppm exists at the center frequency of 700 MHz, since a phase offset value does not exceed a pi ($\pi$) value, there is no problem in compensating for the frequency offset value using a current DMRS structure. Yet, when the center frequency becomes 2 GHz, if the frequency offset corresponds to +/−0.6 ppm, the phase offset value exceeds the pi value. Hence, a problem may occur in compensating for the frequency offset value using the current DMRS structure. Moreover, if the center frequency corresponds to 5.9 GHz, although a frequency offset value corresponds to +/−0.2 ppm, the phase offset value exceeds the pi value. Hence, a problem may occur in compensating for the frequency offset value using the current DMRS structure.

In fact, the frequency offset of +/−0.2 ppm may correspond to a minimum frequency offset value in V2V. In order to perform communication between two vehicles synchronized based on a single vehicle or an eNB, it is necessary to assume that a frequency offset of +/−0.2 ppm already exists. In this case, if the vehicles operate on a center frequency of 5.9 GHz, it is difficult to compensate for the frequency offset using a current DMRS structure.

Table 4 shows a simulation result showing an amount of phase offset when a frequency offset corresponds to x ppm and a DMRS of y symbol interval is used.

As shown in Table 4, if a frequency offset value is equal to +/−0.2 ppm, it is necessary to have a DMRS of 5-symbol interval. If a frequency offset value corresponds to +/−0.4 ppm, it is necessary to have a DMRS of 2-symbol interval. If a frequency offset value is equal to or greater than +/−0.6 ppm, it is necessary to have a DMRS of 1-symbol interval to correctly compensate for the frequency offset.

TABLE 4

|  | 0.1 ppm 0.1 | 0.2 ppm 0.2 | 0.3 ppm 0.3 | 0.4 ppm 0.4 | 0.5 ppm 0.5 | 0.6 ppm 0.6 | 0.7 ppm 0.7 | 0.8 ppm 0.8 | 0.9 ppm 0.9 | 1.0 ppm 1 |
|---|---|---|---|---|---|---|---|---|---|---|
| 1symbol | 0.0714286 | 0.264791 | 0.529583 | 0.794374 | 1.059165 | 1.323957 | 1.588748 | 1.853539 | 2.118331 | 2.383122 | 2.647913 |
| 2symbol | 0.1428571 | 0.529583 | 1.059165 | 1.588748 | 2.118331 | 2.647913 | 3.1775 | 3.70708 | 4.23666 | 4.76624 | 5.29583 |
| 3symbol | 0.2142857 | 0.794374 | 1.588748 | 2.383122 | 3.1775 | 3.97187 | 4.76624 | 5.56062 | 6.35499 | 7.14937 | 7.94374 |
| 4symbol | 0.2857143 | 1.059165 | 2.118331 | 3.1775 | 4.23666 | 5.29583 | 6.35499 | 7.41416 | 8.47332 | 9.53249 | 10.5917 |
| 5symbol | 0.3571429 | 1.323957 | 2.647913 | 3.97187 | 5.29583 | 6.61978 | 7.94374 | 9.2677 | 10.5917 | 11.9156 | 13.2396 |
| 6symbol | 0.4285714 | 1.588748 | 3.1775 | 4.76624 | 6.35499 | 7.94374 | 9.53249 | 11.1212 | 12.71 | 14.2987 | 15.8875 |
| 7symbol | 0.5 | 1.853539 | 3.70708 | 5.56062 | 7.41416 | 9.2677 | 11.1212 | 12.9748 | 14.8283 | 16.6819 | 18.5354 |
| 8symbol | 0.5714286 | 2.118331 | 4.23666 | 6.35499 | 8.47332 | 10.5917 | 12.71 | 14.8283 | 16.9466 | 19.065 | 21.1833 |
| 9symbol | 0.6428571 | 2.383122 | 4.76624 | 7.14937 | 9.53249 | 11.9156 | 14.2987 | 16.6819 | 19.065 | 21.4481 | 23.8312 |
| 10symbol | 0.7142857 | 2.647913 | 5.29583 | 7.94374 | 10.5917 | 13.2396 | 15.8875 | 18.5354 | 21.1833 | 23.8312 | 26.4791 |
| 11symbol | 0.7857143 | 2.912705 | 5.82541 | 8.73811 | 11.6508 | 14.5635 | 17.4762 | 20.3889 | 23.3016 | 26.2143 | 29.127 |
| 12symbol | 0.8571429 | 3.1775 | 6.35499 | 9.53249 | 12.71 | 15.8875 | 19.065 | 22.2425 | 25.42 | 28.5975 | 31.775 |
| 13symbol | 0.9285714 | 3.44229 | 6.88457 | 10.3269 | 13.7691 | 17.2114 | 20.6537 | 24.096 | 27.5383 | 30.9806 | 34.4229 |
| 14symbol | 1 | 3.70708 | 7.41416 | 11.1212 | 14.8283 | 18.5354 | 22.2425 | 25.9495 | 29.6566 | 33.3637 | 37.0708 |

The present invention proposes a method of designing a DMRS to correctly compensate for a frequency offset in the abovementioned V2V scenario. Basically, in order to compensate for a frequency offset, it is preferable to design an interval to which a reference signal (RS) is mapped to be short in a time resource.

As shown in FIGS. 10a and 10b, a DMRS time interval of a current LTE uplink resource corresponds to 6 to 7 OFDM symbols. If the interval is reduced, although it is able to more easily compensate for a frequency offset, DMRSs are concentrated on a specific resource, thereby degrading DMRS channel estimation performance. Unlikely, for a frequency offset, it may additionally allocate a DMRS to a DMRS belonging to a current uplink resource. Yet, this method has a demerit in that DMRS overhead is increasing.

The present invention may consider either an SC-FDMA (Single Carrier Frequency Division Multiple Access) structure or an OFDM (Orthogonal Frequency Division Multiple Access structure) structure. In case of considering the OFDM structure, in order to match the OFDM structure used in an LTE downlink resource with a frequency boundary of an LTE uplink resource, it may shift the structure as much as a half of a subcarrier size.

Embodiment 1

Figure 11A:
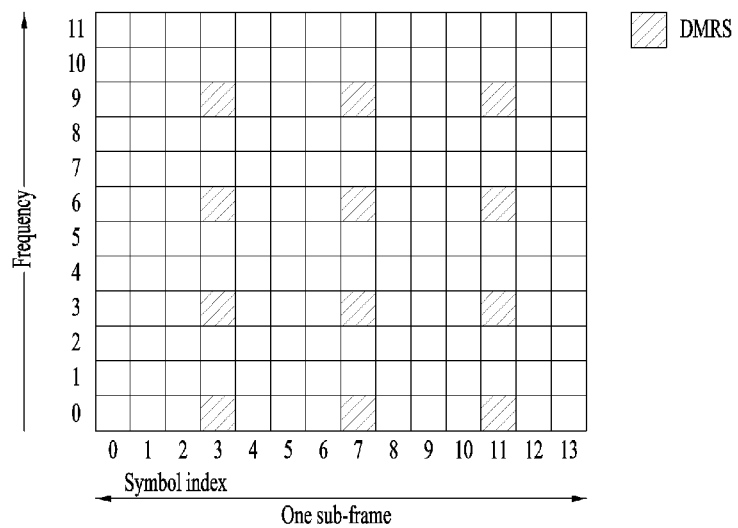
FIGS. 11 to 28 are diagrams illustrating a DMRS design according to embodiments of the present invention.

In order to design a time interval of a DMRS to be short for a frequency offset without increasing DMRS overhead, it may use DMRSs of a comb type. The DMRSs of the comb type corresponds to DMRSs mapped to a resource element with the same frequency interval in a frequency axis having the same OFDM symbol index. For example, a DMRS is additionally mapped to a column in addition to a column to which an uplink DMRS is currently mapped and the DMRSs are designed to have an interval of 3 subcarriers. The abovementioned DMRSs of the comb type are shown in FIG. 11a.

Figure 11B:
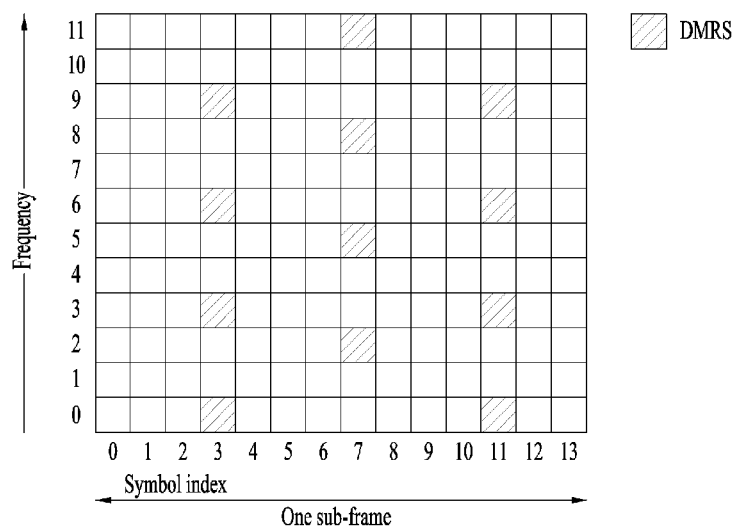

When DMRSs are designed using a comb type, since an OFDM symbol index to which a DMRS is mapped is mapped by the same pattern, DMRS estimation performance can be deteriorated. For example, in case of a DMRS design shown in FIG. 11a, it is able to see that DMRSs are more mapped to the bottom part of a resource block pair. In order to more enhance the DMRS design, as shown in FIG. 11b, a DMRS can be designed to be symmetrical to a different OFDM symbol on the basis of a frequency axis in a partial OFDM symbol index to which a DMRS is mapped. For example, referring to FIG. 11b, it is able to see that DMRSs are symmetrically mapped to a 7$^{th}$ OFDM symbol on the basis of the frequency axis compared to a 3$^{rd}$ OFDM symbol and an 11$^{th}$ OFDM symbol.

Figure 11C:
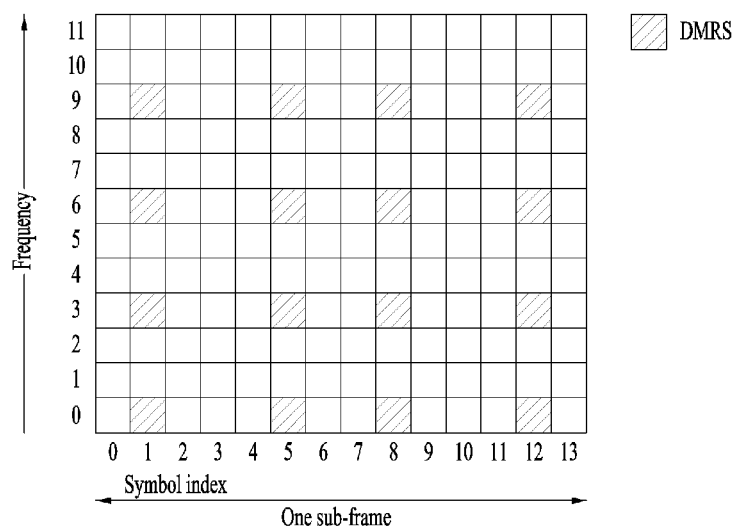
Figure 11D:
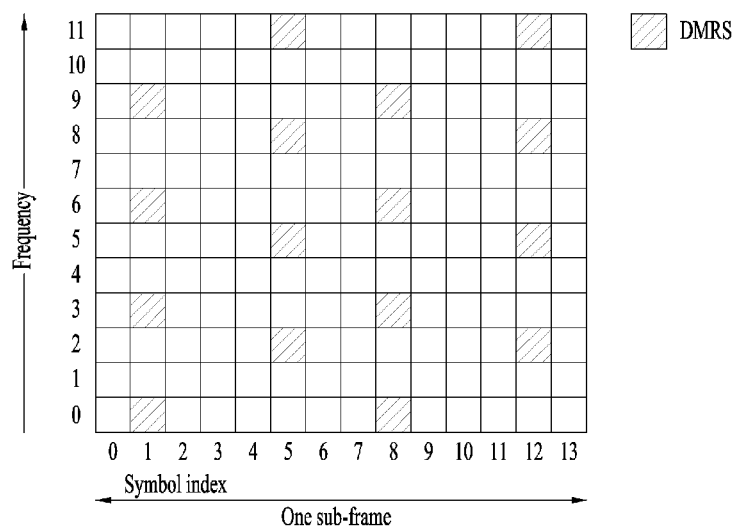

The comb type design is similarly used in a current LTE downlink physical format when a CRS (cell-specific reference signal) is mapped. Currently, CRS mapping is performed on a first OFDM symbol. Yet, as shown in FIG. 11c, when the CRS mapping is performed, it may be able to avoid the position (i.e., the first OFDM symbol) for AGC in V2V. In particular, it may move a CRS backward as much as one OFDM symbol in a time resource. In order to more enhance DMRS performance, as shown in FIG. 11d, it may be able to design DMRSs to be mapped to OFDM symbols symmetrical to each other on the basis of a frequency axis.

Moreover, when a DMRS is mapped to a column according to the embodiment 1, data can be mapped to a position of the column where a DMRS is not mapped. Or, when a DMRS is mapped to a column, a DMRS of a different vehicle can be mapped to a position of the column where a DMRS is not mapped. To this end, it may be able to additionally configure a shift value and design all DMRSs to be shifted as much as m number of subcarriers.

Figure 12A:
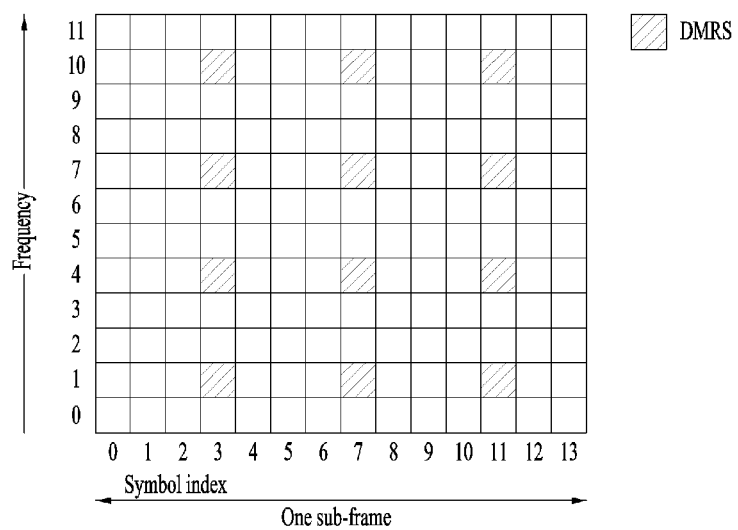
Figure 12B:
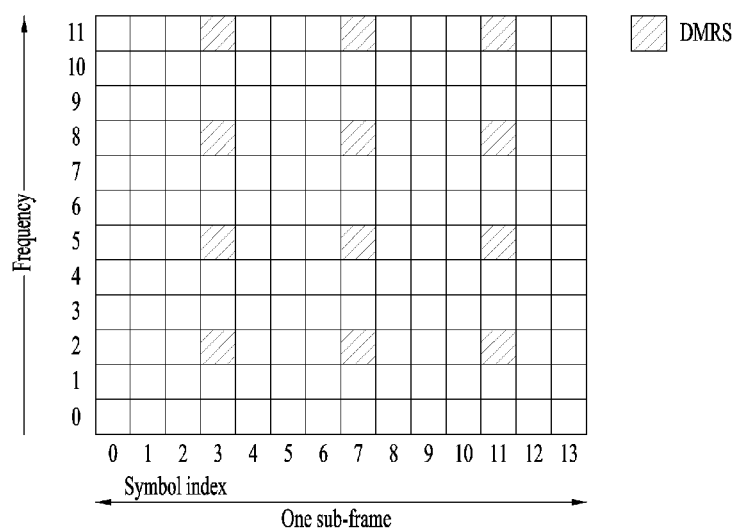

For example, if the DMRSs shown in FIG. 11a are designed to be shifted as much as one subcarrier, it becomes FIG. 12a. If the DMRSs shown in FIG. 12a are designed to be shifted as much as one subcarrier, it becomes FIG. 12b. Hence, the DMRS designs shown in FIGS. 11a, 12a, and 12b can be used by a different vehicle.

Figure 13A:
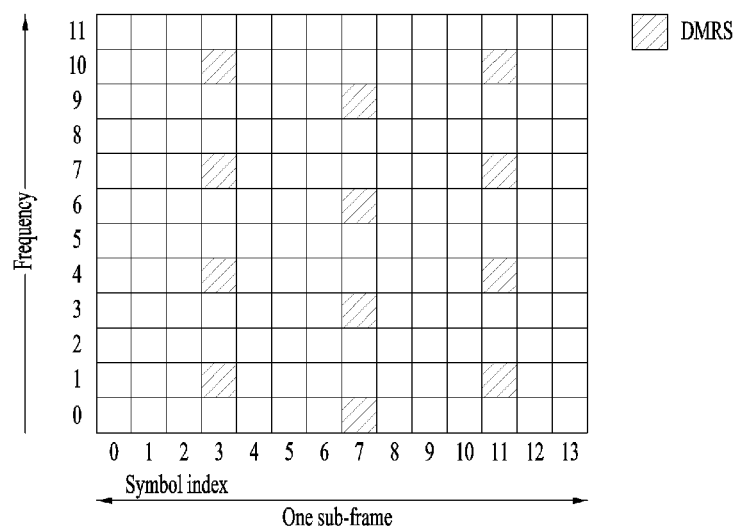
Figure 13B:
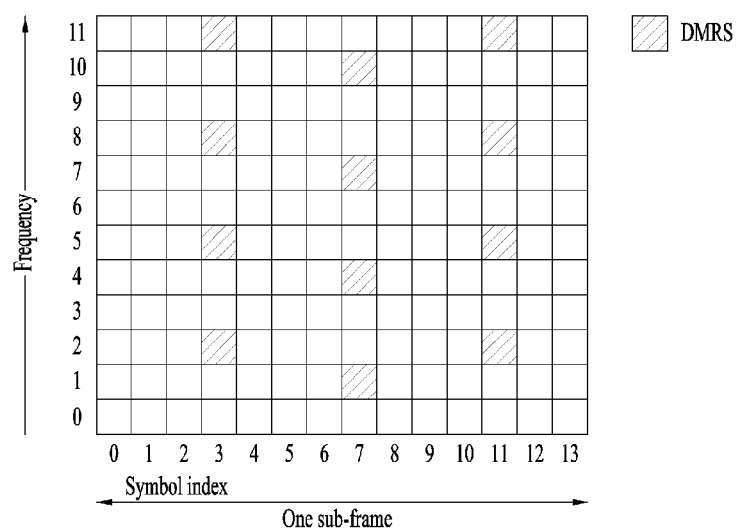

If the same principle is applied to the DMRS design shown in FIG. 11b, it becomes FIG. 13a. For example, DMRSs are shifted as much as one subcarrier in a 7$^{th}$ OFDM symbol and 12 subcarriers are shifted using modulo arithmetic. In particular, when DMRSs, which are mapped within a single RB pair, are shifted for subcarriers, the DMRSs can be shifted using modulo arithmetic in order to make the DMRSs not to be deviated from a region of the RB pair. If the DMRSs shown in FIG. 13a are designed to be shifted as much as one subcarrier, it becomes FIG. 13b.

Or, when subcarriers are shifted, the DMRS design shown in FIG. 11b can maintain symmetric in the aspect that DMRSs mapped to OFDM symbols are symmetrical on the basis of a frequency axis. Hence, If OFDM symbols to which DMRSs are mapped are symmetrical to each other, subcarrier shift may move DMRSs in an opposite direction on the basis of the frequency axis. For example, if subcarrier shift is performed on a plurality of DMRSs in an opposite direction, one side (i.e., one DMRS) applies subcarrier shift m to the bottom of the frequency axis (i.e., negative m) and another side (i.e., another DMRS) applies the subcarrier shift m to the top of the frequency axis (i.e., positive m). This subcarrier shift can apply modulo arithmetic on the basis of the frequency axis in order to make DMRSs not to be deviated from a region of an RB pair.

If a DMRS design is shifted in a unit of a subcarrier according to the embodiment 1, a different vehicle may use a DMRS. An eNB can set a shift value to a transmitting vehicle or a receiving vehicle via dynamic signaling, semi static signaling, or RRC signaling. Or, a transmitting vehicle may randomly select the shift value. Or, the shift value can be configured in advance in every transmitting vehicle. Moreover, a transmitting vehicle may inform a receiving vehicle of the signaling via dynamic signaling, semi static signaling, or RRC signaling.

According to the first embodiment of the present invention, a DMRS is mapped to N number of resource elements on an OFDM symbol index to which a DMRS is mapped in a resource block. In order to support more vehicles using the same resource element, it may apply an orthogonal code having a length of N to N number of resource element combinations. An eNB can set a value of the orthogonal code to a transmitting vehicle or a receiving vehicle via dynamic signaling, semi static signaling, or RRC signaling. Or, a transmitting vehicle may randomly select the value. Or, the value of the orthogonal code can be configured in advance in every transmitting vehicle. Moreover, a transmitting vehicle may inform a receiving vehicle of the signaling via dynamic signaling, semi static signaling, or RRC signaling.

Moreover, according to the first embodiment, when a DMRS sequence is generated, slot numbers can be included in the DMRS sequence. In this case, several slot numbers can be overlapped in a subframe.

For example, when a DMRS sequence is designed like FIG. 11a, a DMRS of a $7^{th}$ OFDM symbol index and a DMRS of an $11^{th}$ OFDM symbol index may use the same slot number. In order to make the DMRSs use a different slot number, it may use a value indicating an order of an OFDM symbol among OFDM symbols to which a DMRS is mapped in a subframe instead of a slot number for generating a DMRS. Or, when a DMRS is transmitted over a plurality of resource blocks, it may use a value indicating an order of an OFDM symbol among OFDM symbols to which a DMRS is mapped in a plurality of the resource blocks instead of a slot number for generating a DMRS.

Basically, when DMRSs are designed using a comb type, it may not map a DMRS to the first OFDM symbol for AGC (automatic gain control). Or, it may not map a DMRS to the last OFDM symbol for TA (timing advance).

Embodiment 2

According to embodiment 2, it may use a DMRS form mapped to an LTE downlink RB pair. A DMRS is mapped to a current LTE downlink like FIG. 14.

If the abovementioned structure is used in V2V, since a minimum DMRS interval corresponds to one OFDM symbol in a time axis, it may be helpful in compensating for a frequency offset.

According to the embodiment 2, when a DMRS is mapped to a column in a resource block, it may be able to map data to a position of the column where the DMRS is not mapped. Or, when a DMRS is mapped to a column, it may be able to map a DMRS of a different vehicle to a position of the column where the DMRS is not mapped. To this end, it may be able to additionally design all DMRSs to be switched on a frequency axis as much as m number of subcarriers using a shift value. When a plurality of DMRS patterns are designed by shifting DMRSs in a unit of a subcarrier, it is preferable to design the patterns like FIG. 15. If subcarrier shift is performed under the design of FIG. 14, 4 DMRSs may appear in succession on a frequency axis. Hence, channel estimation using a DMRS is not efficient.

While DMRSs are shifted as much as m number of subcarriers, 12 subcarriers can be shifted using modulo arithmetic. In particular, when DMRSs mapped within a resource block pair are shifted for a subcarrier, it is preferable to shift the DMRSs using modulo arithmetic to make the DMRSs not to be deviated from the resource block pair.

It may be able to allocate a DMRS design to a different vehicle by shifting the DMRS design in a unit of a subcarrier. An eNB can set a shift value to a transmitting vehicle or a receiving vehicle via dynamic signaling, semi static signaling, or RRC signaling. Or, a transmitting vehicle may randomly select the shift value. Or, the shift value can be configured in advance in every transmitting vehicle. Moreover, a transmitting vehicle may inform a receiving vehicle of the signaling via dynamic signaling, semi static signaling, or RRC signaling.

According to the second embodiment of the present invention, a DMRS is mapped to N number of resource elements on an OFDM symbol index to which a DMRS is mapped in a resource block. In order to support more vehicles using the same resource element, it may apply an orthogonal code having a length of N to N number of resource element combinations. An eNB can set a value of the orthogonal code to a transmitting vehicle or a receiving vehicle via dynamic signaling, semi static signaling, or RRC signaling. Or, a transmitting vehicle may randomly select the value. Or, the value of the orthogonal code can be configured in advance in every transmitting vehicle. Moreover, a transmitting vehicle may inform a receiving vehicle of the signaling via dynamic signaling, semi static signaling, or RRC signaling.

Moreover, according to the second embodiment, when a DMRS sequence is generated, slot numbers can be included in the DMRS sequence. In this case, several slot numbers can be overlapped in a subframe.

Figure 14:
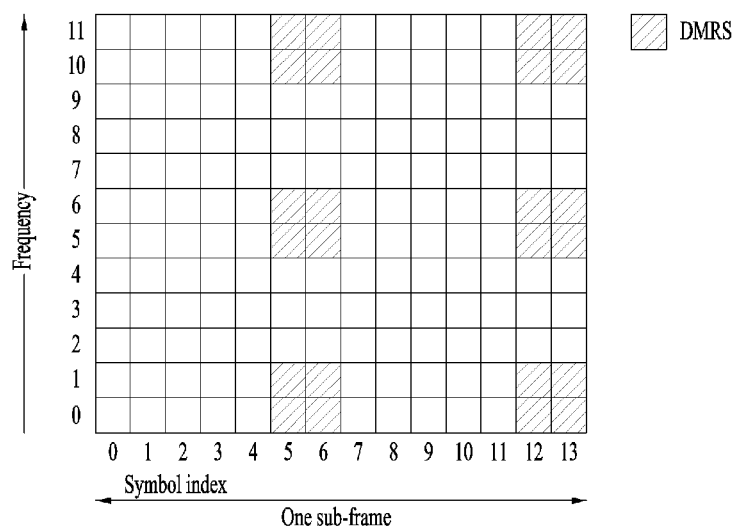
Figure 15:
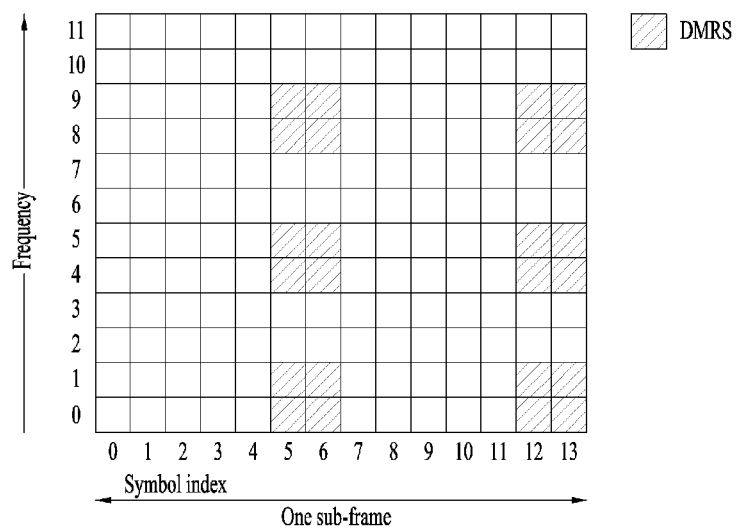

For example, when a DMRS sequence is designed like FIG. 14, a DMRS of a $5^{th}$ OFDM symbol index and a DMRS of an $12^{th}$ OFDM symbol index may use the same slot number. In order to make the DMRSs use a different slot number, it may use a value indicating an order of an OFDM symbol among OFDM symbols to which a DMRS is mapped in a subframe instead of a slot number for generating a DMRS. Or, when a DMRS is transmitted over a plurality of resource blocks, it may use a value indicating an order of an OFDM symbol among OFDM symbols to which a DMRS is mapped in a plurality of the resource blocks instead of a slot number for generating a DMRS.

Figure 16:
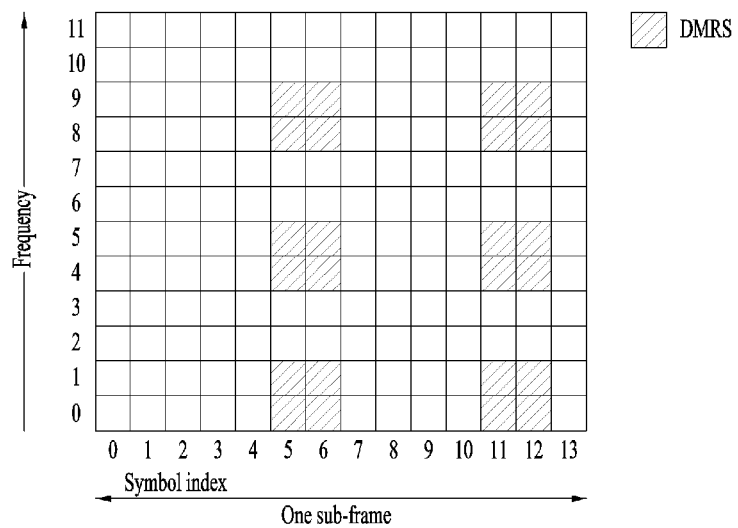

Basically, as mentioned in the embodiment 2, when DMRSs are designed using a comb type, it may not map a DMRS to the first OFDM symbol for AGC (automatic gain control). Or, it may not map a DMRS to the last OFDM symbol for TA (timing advance). In particular, as shown in FIG. 16, the DMRS design shown in FIG. 15 can be designed not to map the last OFDM symbol of a resource block pair in consideration of the AGC and the TA.

Embodiment 3

According to embodiment 3, in order to correctly compensate for a frequency offset, it may be able to additionally allocate DMRSs of L number of rows to an OFDM symbol adjacent to an OFDM symbol to which a DMRS is mapped while DMRS is used according to the design designed in a current LTE uplink resource.

Figure 17:
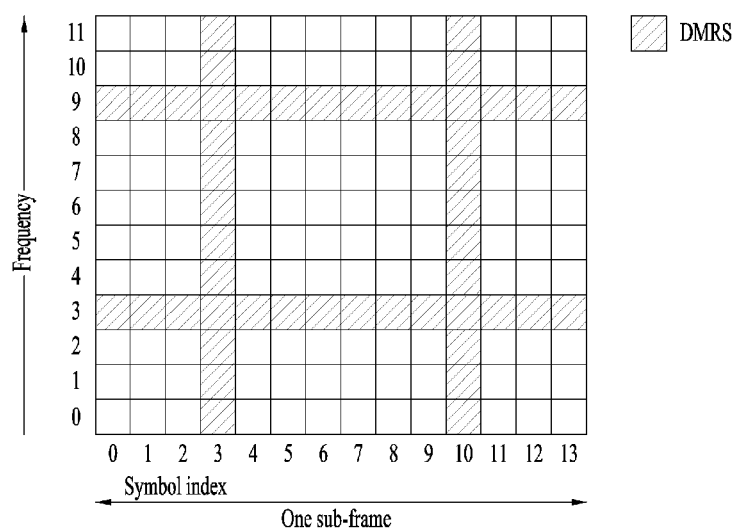

For example, if DMRSs of two rows are added to a current LTE uplink resource, it can be represented as FIG. 17. As shown in FIG. 17, since a minimum OFDM symbol length corresponds to one symbol, it may be helpful in compensating for a frequency offset.

Figure 18:
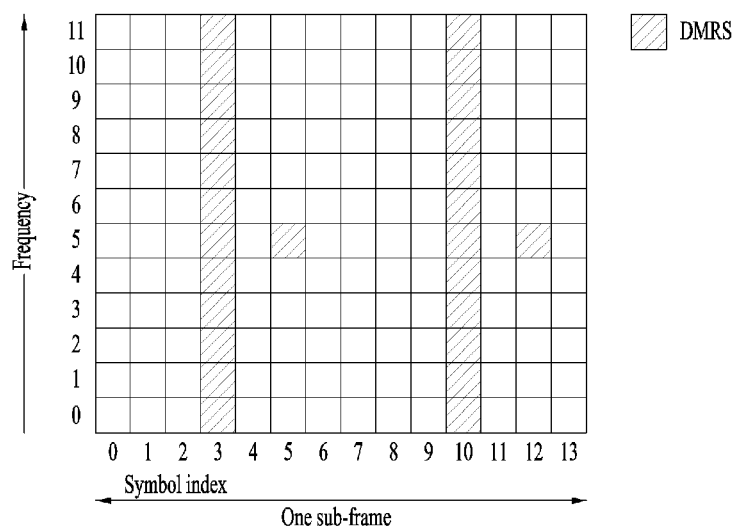

Hence, while DMRSs of L numbers of rows are additionally mapped, a DMRS is set aside in several resource elements of a row in consideration of overhead and the DMRS can be used for compensating for a frequency offset. For example, as shown in FIG. 18, 2 REs are set aside only among DMRSs of a row.

And, the DMRSs of the L numbers of rows can also be used without DMRSs of a column form. For example, it can be represented as FIG. 19. In case of using the DMRSs of the L number of rows without DMRS of a column form, it may be able to easily use a DMRS for compensating a frequency offset and reduce DMRS overhead.

Figure 19:
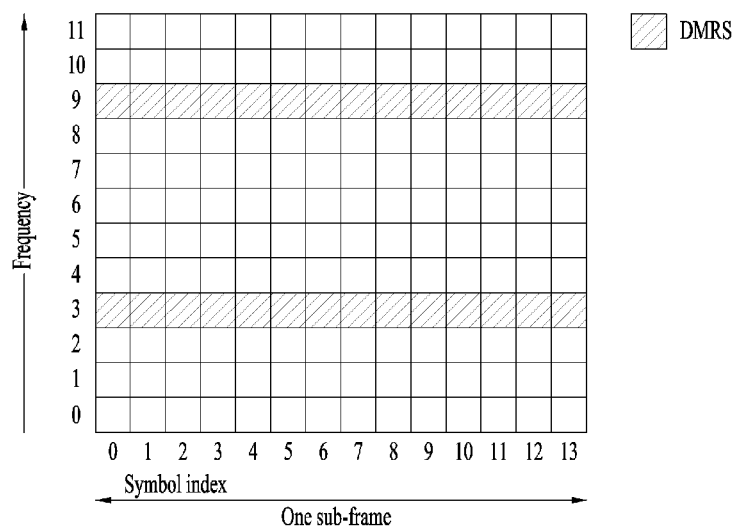

In case of using the DMRSs of the L number of rows without DMRS of a column form, it may have a problem in estimating a channel. For example, when transmission using a narrow band such as transmission using one resource block or two resource blocks is necessary, as shown in FIG. 19, if a reference signal is assigned to a $3^{rd}$ frequency subcarrier and a $9^{th}$ frequency subcarrier, a situation of performing relatively great amount of extrapolation on a narrow band may occur.

In other word, in case of performing transmission using one resource block, channel estimation can be performed on $4^{th}$, $5^{th}$, $6^{th}$, $7^{th}$, and $8^{th}$ subcarriers via $3^{rd}$ and $9^{th}$ DMRSs through interpolation. On the contrary, channel estimation can be performed on $0^{th}$, $1^{st}$, $2^{nd}$, $10^{th}$, and $11^{th}$ subcarriers via extrapolation. Since the interpolation has better channel estimation performance compared to the extrapolation, the design shown in FIG. 19 may correspond to a bad design. In particular, a more serious problem may occur in a frequency selective channel.

Hence, according to the present invention, it may be able to configure DMRSs of a row form to have a wider interval in a narrow band transmission compared to a wideband transmission. In this case, a control channel may correspond to an example of the narrow band transmission. For example, in case of D2D, PSCCH (physical sidelink control channel) may correspond to the example of the narrow band transmission.

More specifically, in case of performing the narrow band transmission, among DMRSs of L numbers of rows, i) two rows can be deployed in the vicinity of $0^{th}$ subcarrier and $11^{th}$ subcarrier of a resource block or ii) two rows can be deployed at the $0^{th}$ subcarrier and the $11^{th}$ subcarrier. Or, in case of performing the narrow band transmission in a first resource block, among DMRSs of L numbers of rows, one row can be deployed in the vicinity of $0^{th}$ subcarrier or can be deployed at the $0^{th}$ subcarrier. And, in case of performing the narrow band transmission in the last resource block, among DMRSs of L numbers of rows, one row can be deployed in the vicinity of $11^{th}$ subcarrier or can be deployed at the $11^{th}$ subcarrier.

As mentioned in the foregoing description, when DMRSs are deployed to perform narrow band transmission, the DMRSs may have an unequal shape in terms of frequency. Yet, it may be able to increase channel estimation performance by reducing extrapolation through the unequally deployed DMRSs. In case of performing wideband transmission, if DMRSs of L numbers of rows are equally deployed in terms of frequency, it may be able to more efficiently perform channel estimation.

Basically, when DMRSs are designed according to the abovementioned embodiments 1 to 3, it may not map a DMRS to the first OFDM symbol for AGC (automatic gain control). Or, it may not map a DMRS to the last OFDM symbol for TA (timing advance).

Embodiment 4

In the aforementioned embodiments 1 to 3, it may not perform the aforementioned DMRS design on all subframes used in a data region. In particular, the DMRS design according to the embodiments 1 to 3 is performed on partial subframes only and a different DMRS design can be applied to the remaining subframes. In this case, a receiving vehicle compensates for AGC or a frequency offset in the subframes to which the DMRS design according to the embodiments 1 to 4 is applied and applies the AGC or the frequency offset to a different subframe. In this case, subframes to which the embodiments 1 to 3 are not applied can apply a DMRS design considering TA only. An eNB can configure information on the subframes in which a DMRS for AGC or a frequency offset is used via RRC signaling. Or, a transmitting vehicle can dynamically inform a receiving vehicle of the information.

Embodiment 5

According to an embodiment 5, while two reference signals corresponding to a current LTE uplink DMRS are mapped using a DMRS mapping method considering a frequency offset, it may be able to map a DMRS having a short time interval by adding a random number of DMRSs.

For example, DMRSs are deployed at a $2^{nd}$ OFDM symbol and a $9^{th}$ OFDM symbol at which a current LTE uplink DMRS is deployed and one or more additional DMRSs can be mapped to near the $2^{nd}$ OFDM symbol or the $9^{th}$ OFDM symbol. The added DMRS can reduce a minimum time interval between DMRSs and a DMRS having a short interval can be used for compensating for a frequency offset.

Figure 20:
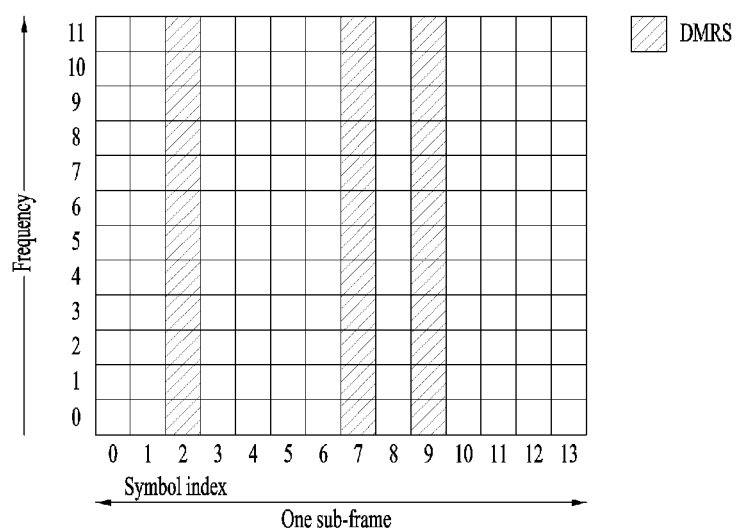

FIG. 20 shows an example according to the embodiment 5. The example shows a case that the $2^{nd}$ and the $9^{th}$ OFDM symbols are mapped in a manner of being similar to a LTE uplink DMRS and a DMRS is additionally mapped to a $7^{th}$ OFDM symbol. By doing so, a minimum interval between DMRSs can be reduced to 2 symbols.

Embodiment 6

According to embodiment 6, it may be able to map DMRSs in consideration of a frequency offset. In particular, it may be able to transmit DMRSs deployed with the same interval. In this case, the same interval means that a time interval between DMRSs is the same in a subframe.

Figure 21:
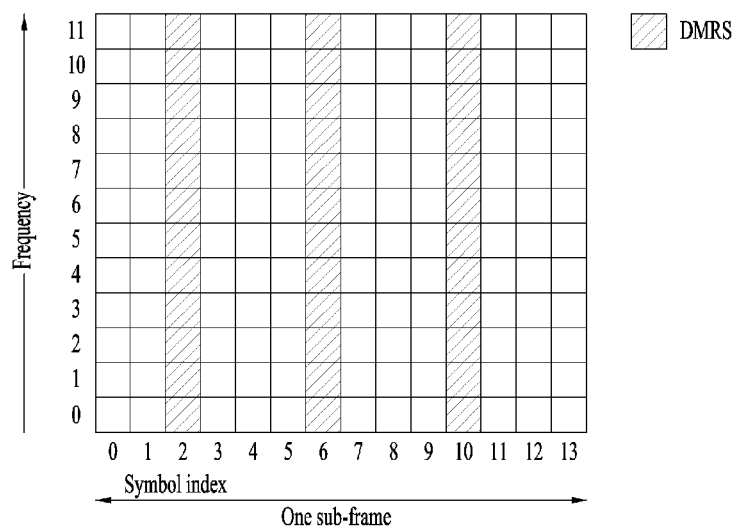

For example, the embodiment 6 can be represented as FIG. 21.

Referring to FIG. 21, DMRSs are mapped to 3 OFDM symbols and an interval between DMRSs corresponds to 3 OFDM symbols. In this case, since the number of reference signals is increased compared to a legacy LTE uplink DMRS, an interval between DMRSs is decreased. Hence, it is able to more efficiently compensate for a frequency offset. The DMRSs can be designed to be deployed with the same interval to more easily perform estimation. If DMRSs are deployed with the same interval, it may have fewer channels on which worst channel estimation is performed compared to a case of asymmetrically deploying DMRSs.

Embodiment 7

In embodiment 7, a method of diagonally mapping DMRSs according to a resource block in a subframe is explained as a DMRS mapping method considering a frequency offset. In the present invention, when DMRSs are diagonally mapped, if a resource block number corresponds to n, it may use equation 1 in the following in a subframe in which m number of OFDM symbols are included.

$$\text{symbolindex}(n) = \text{mod}(\text{symbolindex}(n-1) + \text{shift}_n, m) \quad \text{[Equation 1]}$$

In equation 1, symbolindex(n) corresponds to a symbol to which a DMRS is mapped in an $n^{th}$ resource block in a subframe. It can be differently defined according to a DMRS. And, a value of $shift_n$ plays a role in shifting a DMRS in a time axis according to a change of a resource block index. By doing so, it may have an effect of diagonally mapping a DMRS. The value of $shift_n$ can make DMRSs to be mapped with the same interval in a time axis according to a change of a resource block index by putting the same value on every n.

Figure 22:
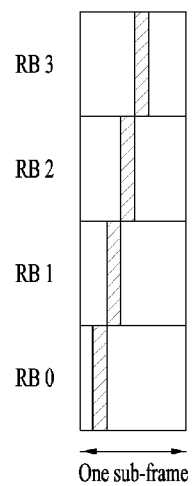

If DMRS are diagonally deployed, it may be able to deploy DMRSs with a short time interval between adjacent resource blocks and it may use the DMRSs for compensating for a frequency offset. For example, as shown in FIG. 22, it may be able to deploy DMRSs with a short time interval. Referring to FIG. 22, as a resource block index increases from an RB0 to an RB3, a position of an DMRS is shifted. In the foregoing description, although it is explained as one DMRS is included in each resource block, two or more DMRSs can be similarly deployed as well.

Since DMRSs are diagonally deployed, it is necessary to compensate for a frequency offset using a DMRS deployed to an adjacent resource block. Yet, since each DMRS has a difference as much as one resource block, it may not be easy to compensate for a frequency offset in a frequency selective channel.

Figure 23:
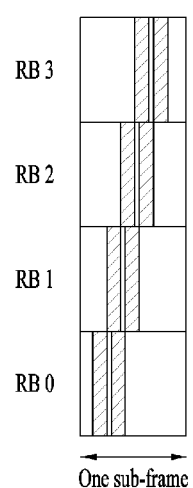
Figure 24:
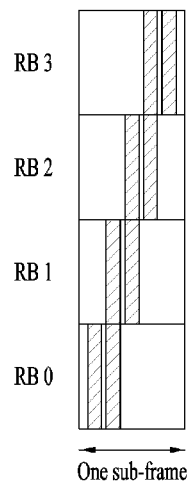

Hence, as shown in FIG. 23, it may be able to additionally map a DMRS to each resource block to more easily compensate for a frequency offset. In this case, as shown in FIG. 24, when a DMRS is additionally mapped to each resource block, it may be able to design the additionally mapped DMRS and a DMRS of an adjacent resource block to have the same time position.

Moreover, the method of diagonally deploying DMRSs mentioned earlier in the embodiment 7 can be defined in advance or an eNB can cell-specifically configure the method via RRC signaling. Or, the eNB can UE-specifically configure the method via RRC signaling or dynamic signaling such as DCI.

Embodiment 8

A method of diagonally mapping DMRSs according to a resource element in a PRB pair is explained in embodiment 8 as a DMRS mapping method considering a frequency offset. Since current DMRSs are mapped to two OFDM symbols in a column form, it may consider a method of diagonally mapping DMRSs in a form of two columns or a method of diagonally mapping DMRSs in a form of one column in consideration of overhead.

When DMRSs are diagonally mapped in a form of one column, the DMRSs may have a length as long as the number of OFDM symbols constructing a PRB pair or a length as long as the number of subcarriers. In case of a current LTE system, it may allocate 14 DMRSs corresponding to the number of OFDM symbols or 12 DMRSs corresponding to the number of subcarriers. In this case, the DMRSs allocated in a form of one column can be mapped in a manner of being divided by half.

In this case, time $t_i$ and frequency $f_i$ to which an $i^{th}$ value of a $j^{th}$ sequence is to be mapped among DMRSs having a half length of 4 DMRSs (or 2 DMRSs) can be determined according to a mapping rule shown in equation 2 in the following.

$$p(s_{i,j})=(t_{i,j},f_{i,j})=(\mathrm{mod}(t_{i-1,j}+\Delta_{t,j},N_{t,j}),\mathrm{mod}(f_{i-1,j}+\Delta_{f,j},N_{f,j}))$$ [Equation 2]

In equation 2, if DMRSs are mapped in a form of two columns in a PRB pair, j has values including 0, 1, 2, and 3 for a DMRS having a half length of 4. If DMRSs are mapped in a form of one column, j has values including 0 and 1 for a DMRS having a half length of 2. For clarity, following description is explained without a j index. According to the equation 2, positions to which DMRSs are mapped form a diagonal line in a manner that the DMRSs are shifted in a time axis as much as $\Delta_t$ and the DMRSs are shifted in a frequency axis as much as $\Delta_f$ from a position to which a previous value of a sequence is mapped. In this case, modulo arithmetic is performed to make the DMRSs not to be deviated from a PRB pair. $N_t$ may correspond to the number of OFDM symbols in a PRB pair or the half number of the OFDM symbols.

For example, in case of a current LTE system, the $N_t$ may correspond to 14 or 7. In this case, $t_i$ has values ranging from 0 to $N_t-1$. If the number of OFDM symbols included in a PRB pair is configured by the $N_t$, it indicates that mapping is performed in a unit of a subframe. If the half number of the OFDM symbols is configured by the $N_t$, it indicates that mapping is performed in a unit of a slot. $N_f$ may correspond to the number of subcarriers included in a PRB pair or the half number of the subcarriers.

And, in case of a current LTE system, the $N_f$ may correspond to 12 or 6. In this case, $f_i$ has values ranging from 0 to $N_f-1$. If the number of subcarriers included in a PRB pair is configured by the $N_f$, it indicates that mapping is performed in a unit of all frequencies constructing a PRB. If the half number of the subcarriers is configured by the $N_f$, it indicates that mapping is performed in a half unit of the frequencies constructing a PRB.

If DMRSs are diagonally mapped according to the present embodiment, the DMRSs are mapped by emptying out the first symbol for AGC or can be mapped by emptying out the last symbol for an RX/Tx switching section.

Figure 25:
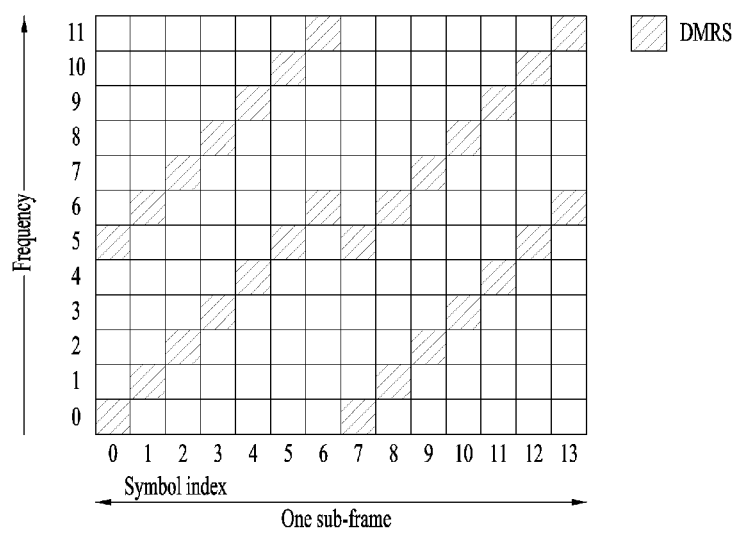

An example of performing diagonal mapping using DMRS sequences of two columns is shown in FIG. 25. FIG. 25 indicates that $N_t=14$, $N_f=12$, and $\Delta_t=\Delta_f=1$ are satisfied. And, $(t_{0,0}, f_{0,0})=(0,0)$, $(t_{0,1}, f_{0,1})=(0,5)$, $(t_{0,2}, f_{0,2})=(7,0)$, $(t_{0,3}, f_{0,3})=(7,5)$ is satisfied. In this case, 4 sequence pieces, which are generated by dividing a sequence of two columns by half, has a length of 7.

Figure 26:
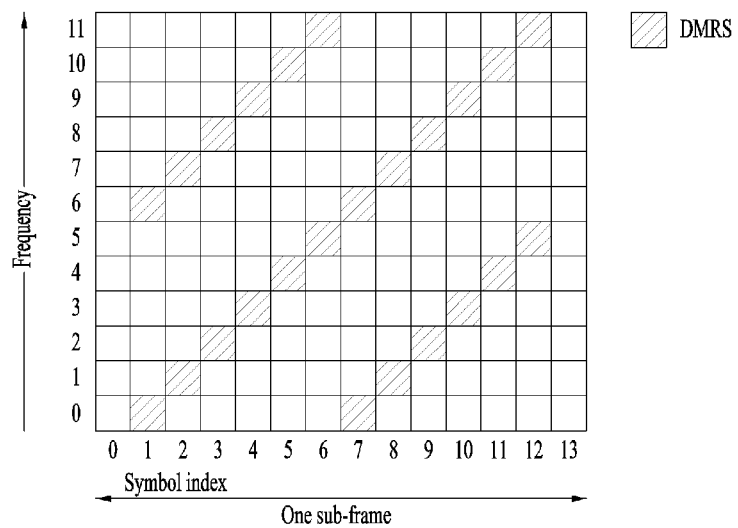

If the first symbol is emptied out for AGC and the last symbol is emptied out for Rx/Tx switching based on the DMRSs deployment mentioned earlier in FIG. 25, it may be able to design DMRS deployment shown in FIG. 26.

FIG. 26 indicates that $N_t=14$, $N_f=12$, and $\Delta_t\Delta_f=1$ are satisfied. And, $(t_{0,0}, f_{0,0})=(1,0)$, $(t_{0,1}, f_{0,1})=(1,6)$, $(t_{0,2}, f_{0,2})=(7,0)$, $(t_{0,3}, f_{0,3})=(7,6)$ is satisfied. In this case, 4 sequence pieces, which are generated by dividing a sequence of two columns by half, has a length of 6.

Figure 27:
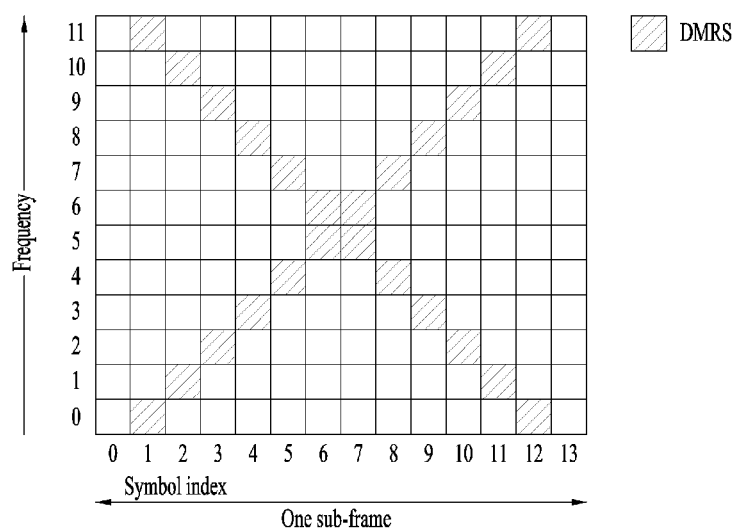

If the first symbol is emptied out for AGC and the last symbol is emptied out for Rx/Tx switching, it may be able to design DMRS deployment shown in FIG. 27. FIG. 27 indicates that $N_t=14$ and $N_f=12$ are satisfied. And, $\Delta_{t,0}=\Delta_{f,0}=\Delta_{t,1}=\Delta_{f,1}=1$, $\Delta_{t,2}=\Delta_{f,2}=\Delta_{t,3}=\Delta_{f,3}=-1$ is satisfied. In this case, 4 sequence pieces, which are generated by dividing a sequence of two columns by half, has a length of 6.

Figure 28:
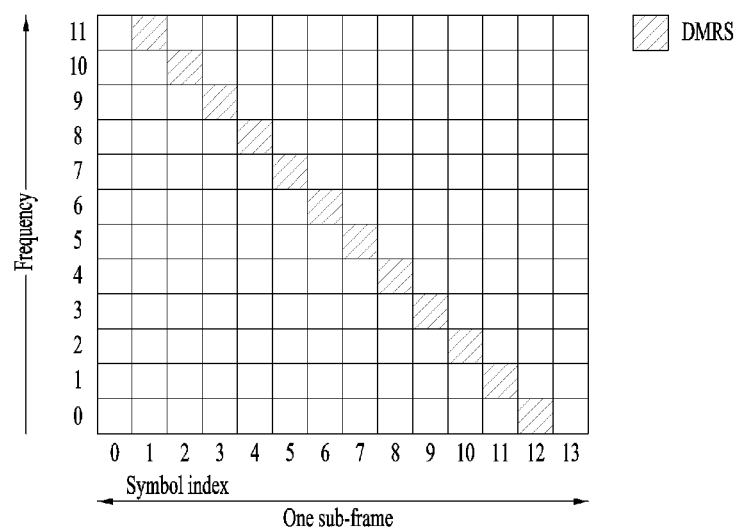

Or, as shown in FIG. 28, diagonal mapping can be performed using a DMRS sequence of one column. Referring to FIG. 28, the first symbol is emptied out for AGC and the last symbol is emptied out for Rx/Tx switching section. FIG. 28 indicates that $N_t=14$, $N_f=12$, and $\Delta_t=\Delta_f=-1$ are satisfied. And, $(t_{0,0}, f_{0,0})=(1,11)$, $(t_{0,1}, f_{0,1})=(7,5)$ is satisfied.

In this case, 2 sequence pieces, which are generated by dividing a sequence of one column by half, has a length of 6.

In the aforementioned embodiments 1 to 8, a position of a DMRS can be used by shifting the position in frequency domain. For example, referring to the DMRS design shown in FIG. 19, DMRSs are positioned at $3^{rd}$ and $9^{th}$ frequency positions. If the positions are shifted to the top as much as one position in frequency domain, the DMRSs are positioned at $4^{th}$ and $10^{th}$ frequency positions. A value for shifting DMRSs to the top or the bottom in frequency domain is referred to as a vertical shift value. As mentioned in the foregoing description, although the vertical shift value can be applied to all subframes with the same value, a different vertical shift value can be applied according to a slot. If a different vertical shift value is applied according to a slot, it is able to more easily perform channel estimation in frequency domain.

In particular, one vertical shift value (applied according to a subframe) or two vertical shift values (applied according to a clot) are applied to the DMRS mapping designed according to the aforementioned embodiments and generate various types of DMRS mapping patterns. The various types of mapping patterns reduce a collision between DMRSs and make channel estimation performance performed by a reference signal to be enhanced.

Moreover, one vertical shift value (applied according to a subframe) or two vertical shift values (applied according to a clot) can be differently applied according to i) a transmission UE ID, ii) a reception UE ID, iii) a group ID of a transmission UE, or iv) a group ID of a reception UE. In particular, if a different DMRS pattern is used according to a transmission UE/a reception UE/a group of a transmission UE/a group of a reception UE, it may be able to prevent a collision between reference signals.

And, one vertical shift value (applied according to a subframe) or two vertical shift values (applied according to a clot) can be differently applied according to a priority of a message transmitted by a transmission UE. If a priority of a message is interlocked with a DMRS pattern, a reception UE can determine whether or not a message of a priority is currently transmitted by decoding a DMRS only.

And, one vertical shift value (applied according to a subframe) or two vertical shift values (applied according to a clot) can be differently applied according to whether a transmission UE corresponds to a pedestrian or a vehicle. If a type of a transmission UE is interlocked with a DMRS pattern, a reception UE can determine a currently transmitting transmission UE by decoding a DMRS only.

Moreover, one vertical shift value (applied according to a subframe) or two vertical shift values (applied according to a clot) can be differently applied according to whether a target reception UE corresponds to a pedestrian or a vehicle. If a type of a reception UE is interlocked with a DMRS pattern, a reception UE can determine whether or not information targeting a certain reception is currently transmitted by decoding a DMRS only.

Figure 29:
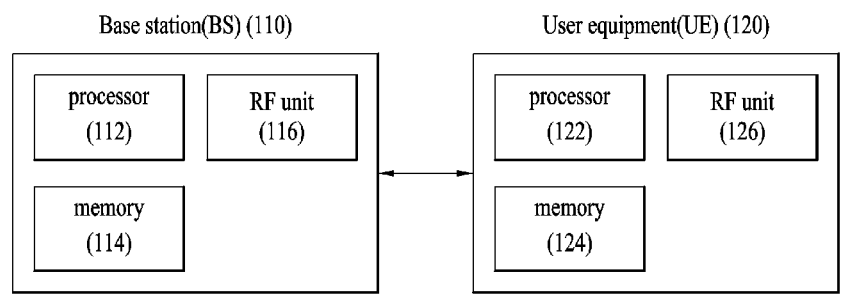
FIG. 29 is a diagram for a base station and a UE applicable to one embodiment of the present invention.

FIG. 29 is a diagram for a base station and a UE applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 29, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of configuring a reference signal for performing V2V communication in a wireless communication system and an apparatus therefor can be applied to various wireless communication systems.

What is claimed is:

1. A method of transmitting various types of reference signals by a first V2V device (vehicle-to-vehicle) in a wireless communication system, the method comprising:
transmitting a first type reference signal through subcarriers on one or more orthogonal frequency division multiple access (OFDM) symbols within a time —frequency resource block; and
transmitting a second type reference signal through OFDM symbols on only one subcarrier within the time-frequency resource block,
wherein the first type reference signal is for demodulating a received signal,
wherein the second type reference signal is for tracking a phase offset,
wherein a number of the OFDM symbols on the only one subcarrier for the second type reference signal is less than a number of OFDM symbols within the time—frequency resource block, and
wherein each of the OFDM symbols for the second type reference signal follows each of the one or more OFDM symbols for the first type reference signal and there is a predetermined time interval between the one or more OFDM symbols for the first type reference signal and the OFDM symbols for the second type reference signal.

2. The method of claim 1,
wherein the one or more OFDM symbols are assigned to have an interval of predefined size, and
wherein the interval of the predefined size is less than 6 OFDM symbols.

3. The method of claim 1, wherein the one or more OFDM symbols comprise a first OFDM symbol and a second OFDM symbol, each of which has a different OFDM symbol index and wherein the first OFDM symbol and the second OFDM symbol are symmetrically assigned on the basis of a frequency axis.

4. The method of claim 1, wherein the first type reference signal is assigned to first resource elements corresponding to at least one first frequency on the indexes of the one or more OFDM symbols.

5. The method of claim 1, wherein the first type reference signal is configured not to be assigned to the first OFDM symbol and the last OFDM symbol within the time—frequency resource block.

6. The method of claim 1, wherein an orthogonal code corresponding to the number of resource elements to which the first type reference signal is assigned is configured to be applied to the first type reference signal.

7. A V2V (vehicle-to-vehicle) device transmitting various types of reference signals in a wireless communication system, the V2V device comprising:
a transceiver; and
a processor, wherein the processor is configured to:
transmit a first type reference signal through subcarriers on one or more orthogonal frequency division multiple access (OFDM) symbols within a time-frequency resource block, and
transmit a second type reference signal through OFDM symbols on only one subcarrier within the time—frequency resource block, wherein the first type reference signal is for demodulating a received signal, and
wherein the second type reference signal is for tracking a phase offset, wherein a number of the OFDM symbols on the only one subcarrier for the second type reference signal is less than a number of OFDM symbols within the time—frequency resource block, and
wherein each of the OFDM symbols for the second type reference signal follows each of the one or more OFDM symbols for the first type reference signal and there is a predetermined time interval between the one or more OFDM symbols for the first type reference signal and the OFDM symbols for the second type reference signal.

8. The method of claim 1, wherein the second type reference signal is transmitted using a part of the OFDM symbols within the time —frequency resource block.

9. The method of claim 8, wherein the part of OFDM symbols do not include the one or more OFDM symbols for the first type reference signal.

10. The method of claim 1, wherein the second type reference signal is for tracking a phase offset in a given time period.

* * * * *